UNITED STATES PATENT OFFICE.

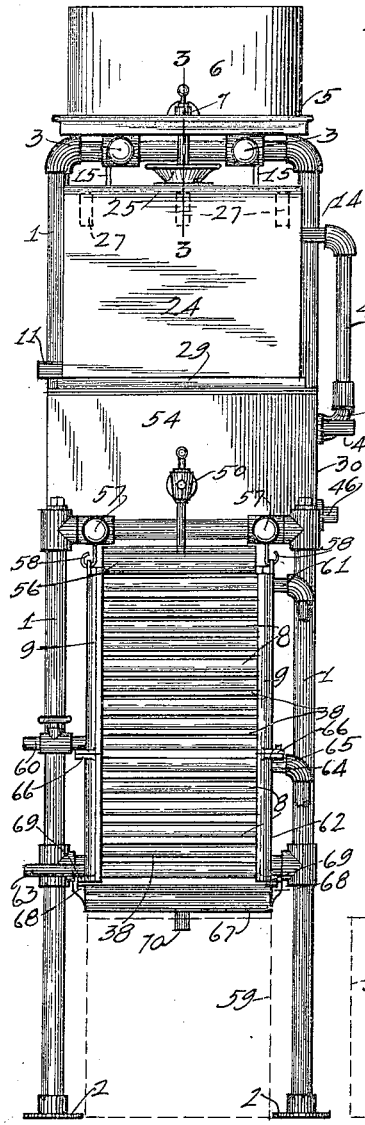

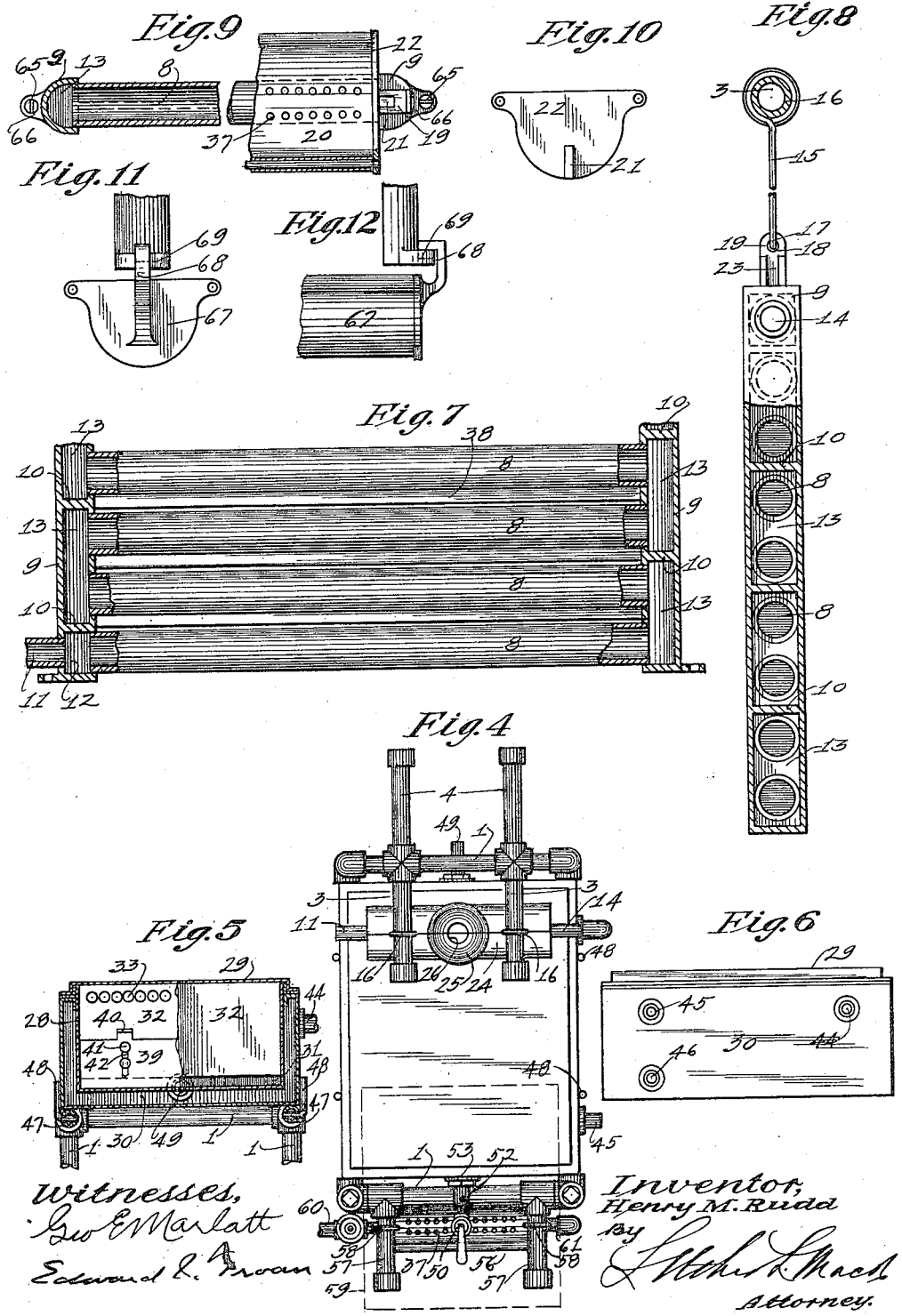

HENRY M. RUDD, OF LOS ANGELES, CALIFORNIA.

COMBINED PASTEURIZING, HOLDING, AND COOLING MEANS.

1,214,376.  Specification of Letters Patent.  Patented Jan. 30, 1917.

Application filed December 11, 1915. Serial No. 67,288.

*To all whom it may concern:*

Be it known that I, HENRY M. RUDD, a citizen of the United States, residing at Los Angeles, in the county of Los Angeles and State of California, have invented a new and useful Improvement in Combined Pasteurizing, Holding, and Cooling Means, of which the following is a specification.

My invention relates to pasteurizing mechanism for use in dairies and like places and particularly to a form of device which includes in addition to the pasteurizing means, means for temporarily storing and holding the milk or liquid and subjecting the same to a slightly reduced temperature than that employed in the pasteurizing process, and also means for cooling the liquid after a predetermined length of time. All of the elements above enumerated are incorporated in the device hereinafter described and they are arranged in compact form and are readily accessible for the purpose of cleaning, etc.

It is necessary that the several elements employed in a device of this kind should be easily disassembled for the purpose of sterilization after each operation, and in my invention each of the elements is suspended or otherwise held loosely in position in such a manner that it may be individually displaced from the assembled mechanism and separately cleaned or sterilized.

Heretofore the pasteurizing process has only occasionally been employed by the small dairies because of the prohibitive price of the modern pasteurizing mechanism which involves the use of large machine operated plants, requiring either electricity or engine for supplying power to the mechanism. It has also been the practice heretofore to embody the pasteurizing, storing and cooling of the milk in separate processes and by separate mechanisms. In my device, as hereinbefore stated all of these operations are effected in the single mechanism, which being portable, and relatively small and simple in comparison with the usual methods and means, may be supplied to the small dairies at a price within their means, notwithstanding the fact that it meets all of the requirements imposed by recent legislation for the prevention of supplying impure milk.

My invention is fully disclosed in the specifications hereinafter following and in the accompanying drawings, in which similar characters of reference indicate the same parts throughout the several views, and in which—

Figure 1 is a front elevation of the assembled mechanism; Fig. 2 is a side elevation of the same, partly in section; Fig. 3 is an enlarged sectional elevation of the upper portion of the pasteurizer and cover therefor; Fig. 4 is a plan of Fig. 1; Fig. 5 is a transverse sectional elevation of the milk holder and heater; Fig. 6 is a side elevation of Fig. 5; Fig. 7 is an elevation of the lower portion of the cooling elements which is also typical of the pasteurizer and with portions thereof shown in section; Fig. 8 is a complete end elevation of Fig. 7, partly in section; Fig. 9 is a plan of Fig. 8, partly in section and showing the distributing trough attached thereto; Fig. 10 is an end elevation of one of the upper troughs; Fig. 11 is an end elevation of the lower trough showing the manner of its suspension from the cooling elements; Fig. 12 is a fragmentary side elevation of Fig. 11.

A rigid frame 1 is provided for supporting all of the elements of my device and this frame is formed of gas pipe, preferably, with suitable vertical, transverse and longitudinal members secured together rigidly by means of ordinary pipe fittings of different character, depending upon the number and character of the members which are to be braced and held together. The frame may be secured to the floor by means of ordinary floor flanges 2, or a cast base may be provided for extremely large devices, and additional members may be added to the frame for convenience.

The top of the frame 1 has a pair of forwardly extending members 3 and a similar pair of rearwardly extending members 4 which are horizontally disposed and are adapted to form a support for the tray 5 in which is placed a receiving tank or receptacle 6 for holding the supply of milk and from which it is delivered through a valve 7 to the pasteurizer. The pasteurizer, as shown in Figs. 2, 3, 7 and 8, consists of a plurality of longitudinal tubes 8 which terminate at opposite ends in vertical members 9 having a plurality of passages arranged therein and separated by partitions 10 so as to form a continuous passage for hot water in only one direction through the tubes.

A hot water inlet 11, which may be connected with a hot water service pipe or tank, communicates with the lower left hand compartment or passage 12 in the member 9 and the water circulates through the several tubes 8 and the passages 13 in the members 9 until a passage similar to the one 12 in the left hand member 9 is reached when it is discharged through an outlet 14. The several tubes 8 and the members 9 are integrally formed or secured together with water tight connections and joints, and are suspended by means of the hangers 15 from the forwardly extending frame members 3, the hangers having loops 16 at the top for engaging the members 3 and hooks 17 at the bottom which are hooked into the eyes 18 of the lugs 19 on the members 9, as shown in Fig. 8. Distributing troughs 20 are carried by and in parallel relation with the pasteurizer, lugs 21 being formed on the ends 22 of the troughs which seat the grooves 23 on the lugs 19 of the members 9, and the troughs being thus easily removable from position on the pasteurizer for any purpose.

A cover 24 which may be in a single piece or formed of two similar sides as shown, is provided for the pasteurizer and has funnel 25 formed in the top which receives the milk from the valve 7 and delivers the same to the trough 20 into which the neck 26 of the funnel extends. The cover is supported on the rims of the trough by means of one or more flat hooks 27 which are soldered or riveted to the inner surface of the cover.

A milk holder 28 which is of rectangular form and which has a suitable cover 29 is suspended in a heating tank 30 of substantially larger dimensions than the holder, and the lower end of the pasteurizer and cover 24 extends downwardly into the holder and at the rear end thereof. The outer edges of the heating tank 30 are bent over at the top so as to form a seat for the flanges of the holder tank and the cover 29 is suitably flanged so as to completely cover the tank and prevent the entry of dust or dirt therein.

The holder tank 28 is subdivided into several compartments 31, four being shown in the drawings, by means of vertical partitions 32, each alternate partition being provided with a plurality of perforations 33 near the top of the tank, and the other of the partitions being shortened at the bottoms to permit the flow of the milk under them. In the first or rear compartment in the holder tank and just beneath the lower end of the pasteurizer, a rectangular trough 34 is provided which extends the full length of the pasteurizer and is seated loosely upon cleats 35 secured to the sides of the tank and a tube 36 serves to drain the milk from the trough into the bottom of the holder tank 28. The trough 20 at the top of the pasteurizer has a plurality of perforations 37 in the bottom arranged in rows on opposite sides of the center so as to distribute the milk in a sheet over the tubes and ribs 38 on the bottoms of the tubes 8 of the pasteurizer insures an even flow of the milk from one to the other of the tubes in the form of a sheet.

It is desirable and necessary that the milk in the holder tank 28 should be agitated to prevent the accumulation of sediment and also for the purpose of preventing the rising of the cream to the surface of the milk in the tank. The arrangement of the vertical partitions 32, as shown, is such that the milk from the trough 34 will fall to the bottom of the tank 28 and will gradually rise in the first of the compartments to the level of the row of perforations 33 near the top of the first partition 32, when it will emerge through these perforations and fall into the second compartment, thence under the second partition, it will enter and rise in the third compartment to the level of the row of perforations and fall into the bottom of and rise in the third compartment, and likewise through as many of the compartments as may be provided.

Those of the partitions 32 which are provided with the rows of perforations 33, while being shortened at the bottom similar to the other of the partitions, have slides 39 with right angularly bent pull pieces 40 at the top and are adapted to slide vertically on the partitions proper by means of rivets or screws 41 which move in slots 42, as shown in Fig. 5. These slides are normally in their lowermost position, as shown in Fig. 2, when the holder tank is in operation, but at the completion of an operation, the slides must be raised so as to permit the milk within the compartments to be completely drained out.

The pasteurizer, as described, is provided with a hot water circulating system, the temperature of which is maintained at about 160 degrees Fahrenheit, and the water from the pasteurizer outlet 14 is discharged into a pipe 43 which is connected with an inlet 44 on the side of the heating tank 30 through which the water circulates and is discharged from the tank at the outlet 45, the temperature of the heating tank being maintained at a temperature of about 140 or 145 degrees Fahrenheit. A clean-out 46 is provided on the side of the tank so that all residue and sediment may be cleaned out when necessary and the standing water drained off. The heating tank 30 is seated on the members 47 of the frame between the pins 48 which are secured in the members 47 and are bent upwardly into contact with the sides of the tank. If it is desired to use steam for heating the tank 30, a steam inlet 49 may be provided at the rear, as shown, or at any other suitable or convenient position, and connected with a steam supply pipe.

The tank 28 is only loosely seated in the outer tank 30 and may be easily removed therefrom, and the cover 29 may be similarly removed from the tank 28. A valve 50 is provided for draining the milk from the tank 28 and is connected with the tank 28 by means of a nipple 51 on the inside of the tank 30 and a nipple 52 on the outside thereof. The nipples 51 and 52 are secured in nuts 53 on opposite sides of the front wall 54 of the tank 30 and the nipple 51 is threaded into a flange 55 on the front wall of the tank 28. Thus when the outer nut 53 is loosened, the inner nipple attached to the tank 28 may be removed from position with the tank 28.

The cooler is composed of tubes and vertical members identical with those of the pasteurizer and is otherwise similarly arranged, there being substantially the same number of tubes and the trough 56 being superimposed upon the vertical members of the cooler after the fashion of the trough 20 on the pasteurizer. The cooler is suspended from the forwardly extending arms 57 at the front of the frame by means of the hangers 58 which are similar to those 15 of the pasteurizer. When the valve 50 is open, the milk will flow therefrom into the trough 56, thence through the perforations in the trough and over the tubes 8 and ribs 38, and finally into a receiving tank which may be provided for the purpose, as represented by broken lines at 59.

Cold water is admitted to the cooler through the inlet 60 and is discharged through the outlet 61, the water circulating through the tubes and vertical members of the cooler in the same manner as previously described in the case of the hot water through the pasteurizer. If it is necessary, a substantially shorter section of cooler 62 may be secured to the bottom of the water cooler, as shown in Figs. 1 and 2, for the purpose of circulating brine or chemicals through the tubes thereof by means of the inlet 63 and the outlet 64. In such case the two sections of coolers may be secured together by means of bolts 65 through the adjacent flanges 66 on the vertical members 9.

A trough 67 similar to troughs 20 and 56 just described, is attached to the lowermost section of the cooler by means of upwardly extending arms 68 on the ends of the trough which seat in grooves formed in the lugs 69 on the lower ends of the vertical members 9 of the cooler, the trough 67, however, being provided with a tube 70 for discharging the milk therefrom instead of the rows of perforations, as in the other form of troughs.

In operation, the tank 6 is first filled with fresh milk and the hot and cold water systems are connected with the pasteurizer and coolers, respectively. When the temperatures have been tested and found to be correct, the valve of the receiving tank is opened and the milk permitted to flow downwardly into and through the trough 20, thence over the heated tubes of the pasteurizer and into and through the trough 34, thence into the bottom of the holder tank 28, when, as previously described, the milk will gradually flow from one of the compartments to the other until the last compartment is reached. It is required that the milk should accumulate and remain in the holder tank 28 for at least 30 minutes in order to insure that all germs have been killed, and after the proper elapse of time the valve 50 may be opened and the milk will then flow into and through the trough 56, from thence downwardly over the tubes of the coolers and into and through the trough 67 to the tank 59 therebelow. The valves on the various tanks may be regulated to provide the proper flow of the milk over the tubes of either the hot or cold water systems, care being taken that the troughs do not overflow and that the flow of the milk over the tubes will be even and smooth for obtaining the best results. The cover over the pasteurizing tubes serves to retain the heat and thus to more quickly heat the milk in its passage thereover, while the cooling tubes remain uncovered, preferably, for the purpose of effecting a more rapid cooling of the milk.

My device as herein described is thoroughly sanitary and may be easily kept clean and sterile, inasmuch as all parts are removable, and the several processes being combined as hereinbefore described, and the use of power eliminated renders the device economical and capable of use in remote districts where electricity is not ordinarily available.

Having thus described my invention, what I claim as new and desire Letters Patent for, is:—

1. A combined pasteurizing and cooling device comprising a liquid receiving receptacle, a removable pasteurizing element provided with a series of communicating compartments, means for distributing the liquid over the pasteurizing element, liquid retention means for holding the liquid and subjecting the same to prolonged auxiliary heating, and tubular cooling means for effecting the rapid cooling of the liquid, the said elements being combined for effecting the treatment of the liquid in a single and continuous operation.

2. A combined pasteurizing and cooling device comprising means for holding the supply of liquid to be treated, primary tubular heating and liquid distributing means for heating the liquid during its passage thereover, intermediate liquid holding means for receiving and holding the liquid in a heated state for a given period of time, tubular cooling means, and distributing means for spreading the liquid over said cooling means, as set forth.

3. A combined pasteurizing and cooling device comprising tubular means for spreading and distributing the liquid to be treated and for heating the same during the distribution thereof, means for retaining the liquid in its heated state under agitation for a predetermined period of time, and tubular means for redistributing the liquid and cooling the same, in a single continuous operation.

4. A combined pasteurizing, liquid holding and cooling device including a primary heating coil for receiving and distributing the flow of liquid, a removable receptacle for receiving the liquid from said coil, heating means for said receptacle, a cold water coil for cooling the liquid discharged from said receptacle, and means for spreading and evenly distributing the liquid over said heating and cooling coils.

5. A combined pasteurizing and cooling device including a circulating hot water heating coil and liquid distributing means therefor, removable liquid holding means for receiving and holding the liquid from the heating coil, hot water heating means for said liquid holding element, a cold water coil for cooling said liquid, and means for spreading and distributing said liquid over said cooling coil.

6. A combined pasteurizing and cooling device including primary heating and liquid distributing means, liquid holding means comprising a plurality of compartments subdivided and alternately communicating at the top and bottom for agitating the liquid in its passage therethrough, auxiliary heating means for prolonging the application of the heat to the liquid during its retention in said holding means, and means for finally cooling said liquid after the heating operation.

7. A combined pasteurizing and cooling device including primary liquid heating and distributing means, liquid holding means comprising a plurality of compartments alternately communicating at the top and bottom for agitating liquid in its passage therethrough, auxiliary heating means for heating the holding means, cooling means arranged adjacent to the holding means, and distributing means for spreading the liquid over said cooling means.

8. A combined pasteurizer and cooler including circulating hot water heating system for the primary and auxiliary heating of the liquid to be treated, liquid retention means comprising a plurality of compartments separated by baffle plates and communicating alternately at the top and bottom for agitating the liquid in its passage therethrough and subjecting the same to the heat from said auxiliary heating means, means for cooling the liquid subsequent to the heating operation, and means for spreading the liquid over said primary heating means and said cooling means.

9. A combined pasteurizer and cooler for pasteurizing, holding a liquid in a heated state for a period of time and cooling the same in a single and continuous process, including a series of heating tubes and means for evenly spreading the liquid thereover for the primary heating of the liquid, a retention receptacle for holding and agitating the liquid delivered thereto from said heating tubes, means for supplying heat to said receptacle, a series of cooling tubes arranged adjacent to said receptacle and means for spreading and delivering the liquid thereto from said receptacle, and a suitable support for and common to all of said elements.

10. A combined pasteurizer and cooler including a primary heating element and liquid spreading means therefor, a cover for said heating element for retaining the heat in the zone of the heater, liquid retention means for receiving the liquid from the heating element, means for heating the liquid in its passage through said retention means, means for cooling the liquid subsequent to the heating operation, and means for spreading the liquid over the cooling means.

11. A combined pasteurizer and cooler including a primary heating element provided with a cover for retaining the heat in the zone of the heater and a liquid spreading means for distributing the liquid over the heater, a retention receptacle for receiving the liquid from and holding the same in a heated state for a period of time, heating means for said receptacle, means for cooling the liquid subsequent to the heating operation, and means for delivering the liquid from said receptacle to and for spreading the same over the cooling means.

Signed at Los Angeles, in the county of Los Angeles and State of California, this 20th day of October, 1915.

HENRY M. RUDD.

Witnesses:
GEO. E. MARLATT,
ANNE HARTENSTEIN.

Copies of this patent may be obtained for five cents each, by addressing the "Commissioner of Patents, Washington, D. C."